March 22, 1938.   G. KILIAN   2,111,860
METHOD OF DRAWING SHEET GLASS
Filed Dec. 14, 1935
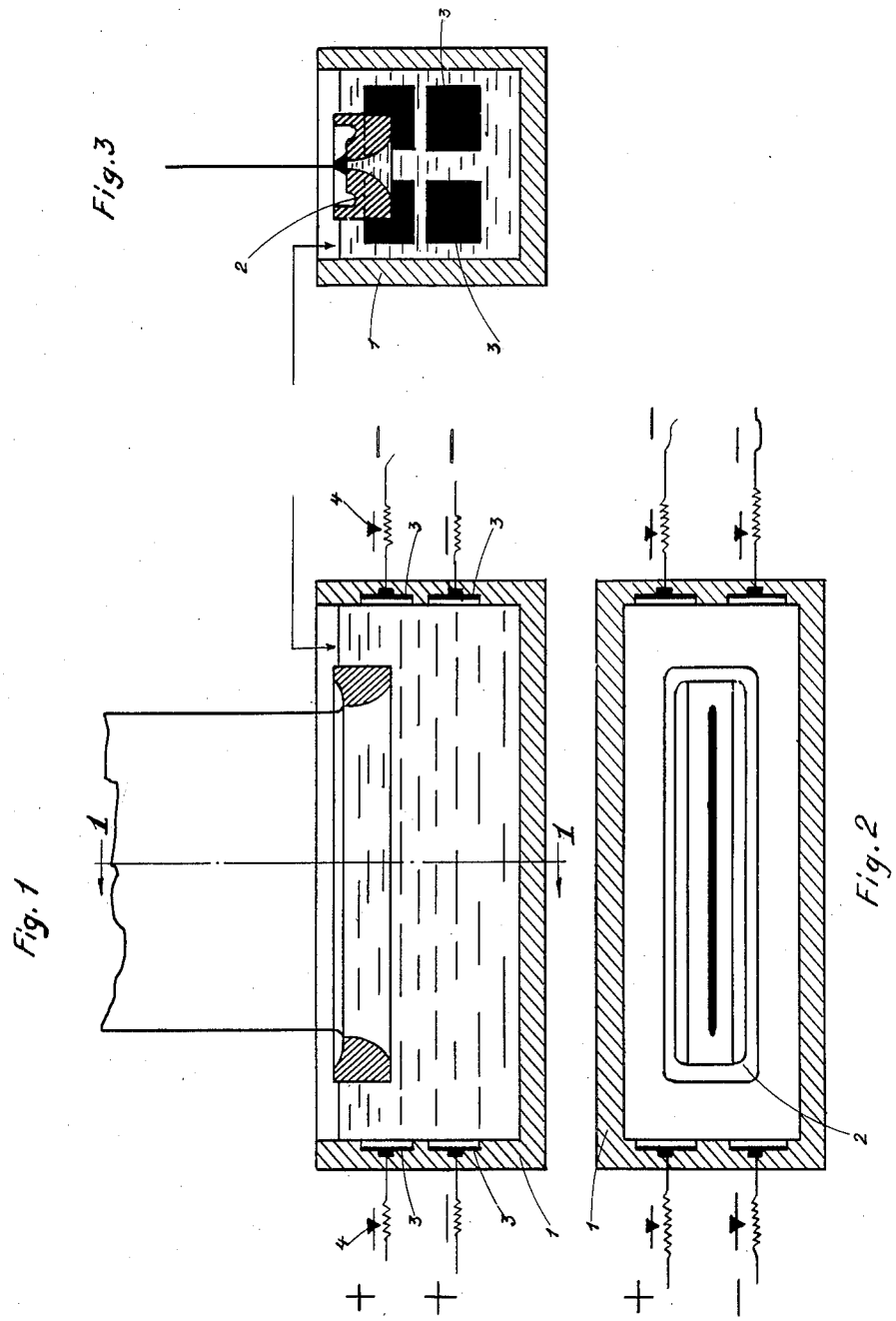
Georg Kilian
INVENTOR Patented Mar. 22, 1938

2,111,860

UNITED STATES PATENT OFFICE 2,111,860

METHOD OF DRAWING SHEET GLASS

Georg Kilian, Weiden, Germany, assignor to Deutsche Tafelglas Aktiengesellschaft (Detag), Furth, Germany, a corporation of Germany Application December 14, 1935, Serial No. 54,384 In Germany June 1, 1934

3 Claims. (Cl. 49—83.1)

This invention relates to a method of drawing sheet glass.

In Fourcault plants, and others for drawing sheet glass without the application of bottom heat to the drawing hearth, the molten glass from the furnace has to be conveyed to the various attached drawing hearths—which are about 3 to 9 in number, depending on the size of the furnace—in channels of considerable length, which channels must not have an inadequate cross-sectional area if they are to supply the several draw-off points with glass of uniform temperature. Experience has shown that, with a width commensurate with that of the sheets, the depth of the glass in the channels should be about 90 cm., and accordingly in the several drawing hearths as well. Given this depth in the channels and drawing hearths, the temperature of the bottom portion of the glass differs considerably from that of the top layers situated round the drawing nozzles. This cooling of the lower layers of the glass is still further assisted by the inevitable cooling down of the bottom of the drawing hearth during the drawing process and not infrequently leads to devitrification in the drawing hearth. Since, owing to the unfavourable influence on the drawing operation, there is no possibility of heating in the workroom itself while work is in progress, the glass situated round the nozzle is also progressively cooled, from above downwards, in the course of the work. Owing to the devitrification produced by said coolings, it has hitherto been necessary to suspend the drawing operation after a run of about 100–120 hours, and after removing the length of drawn glass present in the machine, to heat up the machine again. This re-heating, for the purpose of making the glass in the drawing hearth warm once more, and in condition for drawing, entails a troublesome loss of many hours of time.

The aim of the present invention is to prevent, or at least substantially lessen, the continuous cooling down of the machine room, and the resulting reduction in the output of the plant.

In plants of the aforesaid type, the invention proposes to control the temperature of the glass bath in the drawing hearth by means of a plurality of heating zones or paths arranged in the glass bath and independently—in some cases, automatically—controllable. These zones or paths are distributed and oriented in the glass bath, in a manner suitable for maintaining, or restoring, the uniformity of the glass at the drawing-off point, the preferred orientation being that of the longitudinal direction of the orifice of the nozzle. By this means it is possible to supply the nozzle continuously with a uniform glass of the necessary temperature, said glass being, in particular, entirely free (or nearly so) from devitrification due to cooling, inasmuch as devitrification through cooling of the top of the bath is precluded from the outset, whilst that, and other irregularities—which, notwithstanding the care taken to maintain equilibrium of flow in the bath, may be introduced from stagnant portions therein—are dissipated before reaching the nozzle.

The controllable heating zones or paths may be formed by pairs of electrodes located on opposite narrow sides of the drawing hearth, the passage of current through the glass bath being adapted to be influenced by automatic control devices.

The present invention is not, of course, restricted to this particular design of the controllable heating zones, which may be arranged otherwise than for the direct passage of an electric current. For example, tubes of refractory material and heated internally by electrical resistances, burner flames and the like; or also electrical resistances located directly in the glass bath, may be employed. The sole essential is that the heating zones should enable the temperature of the glass bath to be controlled at convenience, without impairing the requisite uniformity of the glass flowing to the drawing nozzle.

Depending on the conditions of flow in the glass bath of the drawing hearth, the controllable heating zones may be of any convenient length, position and direction, which does not disturb the requisite uniformity of the glass flowing to the nozzle, and may even favour such uniformity, for example by setting up currents that are useful in producing that condition.

In order more clearly to understand the invention, reference is made to the accompanying drawing, which illustrates diagrammatically and by way of example a typical arrangement of controllable heating zones for a drawing plant operating in accordance with the Fourcault process, and in which:—

Fig. 1 is a cross section of the drawing hearth equipped with controllable heating zones;

Fig. 2 is a horizontal section of same; whilst

Fig. 3 is a section along the line 1—1 of Fig. 1.

In the rectangular drawing hearth 1, with a tapping nozzle 2 arranged on the surface of the molten glass, plate electrodes 3 are arranged side by side and in superposition, on the narrow walls, each pair of oppositely disposed electrodes forming part of the same circuit. Automatically responsive control devices are interposed in the circuit.

In a known arrangement for drawing sheet glass, in a plant operating the Fourcault process—that is without bottom heating—the whole of the glass bath in the forehearth, over the entire cross section and from one narrow side to the other, forms only a single heating zone, running in the same direction as the root of the glass sheet and the broad sides of the hearth. The heating action of the electric current must therefore be substantially uniform throughout the glass bath, and the rise in temperature produced by a given supply of current must be the same in all parts of the bath. In such case, however, any differences in temperature which may have existed in the glass bath of the drawing hearth, cannot be rectified by the known heating arrangement, but are merely transferred to a higher temperature range.

Moreover, the heating of the entire cross sectional area of the bath involves the great risk of setting in motion, and mingling with the glass flowing to the nozzle, those usually stagnant portions of the glass bath, along the walls and bottom, which have become more aluminous through corrosion of the furnace lining.

It is not impossible to dissolve the devitrified inclusions formed in the drawing hearth of the known type, provided the direct electrical-resistance heating of the entire bath be sufficiently prolonged and powerful. However, since, in order to dissolve devitrified glass, the temperature of the glass bath must be raised considerably higher than the working temperature, the danger arises that, at the same time, the glass temperature will be too high at the working point, viz. along the line of draft and therefore disturbing or even stopping the drawing process.

In complete contrast with such an unsuitable heating arrangement, the present invention provides the glass bath with a plurality of current paths, distributed and directed in such a manner that all local differences in temperature, capable of impairing the uniformity of the glass reaching the nozzle, can be prevented, or remedied, without thereby undesirably affecting the mean temperature of the glass bath in the drawing hearth, or the temperature at the draw-off point.

The employment of electrical heating zones, arranged in succession in the direction of flow, and—parallel to one another—transversely to the flow of the glass, is already known, in connection with devices for feeding glass-blowing machines, for heating the glass which flows, through the fore-hearth, to the bottom outlet of same, through which it is intended to fall into the mould of the machine, in the form of drops of uniform size and shape. Owing to the entire difference between the movement and temperature distribution of the glass in a fore-hearth of this kind, and those in the case of a drawing hearth without bottom heating, it is impossible to deduce from this known arrangement, the manner in which a drawing hearth should be heated in order to maintain the uniformity of the glass at the draw-off point, either continuously or at least for a longer time than heretofore. All that could be inferred from the known arrangement was the heating of glass, in the furnace or hearth, by the direct passage of electric current.

Finally, a drawing hearth is known, which operates by the Libbey-Owens process and, accordingly, is heated, from above and below, by means of burners and in addition, by electrical resistances which are embedded in the bottom of the hearth and are designed to serve as auxiliary heaters in the event of the bath temperature having fallen to an undue extent, as the result, on the one hand, of the difficult and sluggish coaction of the top and bottom burners, and through the cooling, on the other. By means of these embedded resistances, electric heating zones, conducted by the molten glass in the drawing hearth itself, are coupled in such a manner that they function, to some extent, as automatic throttle- or relief valves of the bottom-heating arrangement, but are not capable, of themselves, of raising the temperature of the hearth.

I claim:—

1. In a sheet glass drawing plant, a narrow drawing hearth, a drawing nozzle extending longitudinally in said hearth, a plurality of superposed electrodes exposed within said hearth adjacent each edge of the sheet and on each side of it, a plurality of electric energizing circuits each of said circuits connecting one of said electrodes to the electrode located adjacent the other edge of the sheet and opposite said first mentioned electrode respectively.

2. In drawing sheet glass without bottom heating of the drawing hearth, a method for promoting uniformity of the glass at the drawing-off line, comprising heating the interior of the glass along a plurality of separate lines disposed within the mass of the glass adjacent the drawing-off line and distributed symmetrically with respect to the latter, and independently controlling the heat in each of said lines.

3. In drawing sheet glass without bottom heating of the drawing hearth a method for promoting uniformity of the glass at the drawing-off line, comprising passing electric current through the glass parallel to the drawing-off line in a plurality of separate paths disposed within the mass of glass adjacent the drawing-off line and distributed symmetrically with respect to the latter, and independently controlling the flow of current through each of said paths.

GEORG KILIAN.